United States Patent
Schouest

[11] Patent Number: 5,938,397
[45] Date of Patent: Aug. 17, 1999

[54] LOADING AND UNLOADING RAMP FOR PICKUP TRUCKS TRAILERS AND VANS

[76] Inventor: Paul Daryl Schouest, 225 Constitution Dr., Maurice, La. 70555

[21] Appl. No.: 09/240,376

[22] Filed: Jan. 29, 1999

[51] Int. Cl.⁶ .................................................. B65G 67/02
[52] U.S. Cl. ........................... 414/537; 14/69.5; 280/800; 414/480
[58] Field of Search ..................... 414/537, 538, 414/480, 483; 14/69.5; 296/61, 62; 29/897.2, 897.3, 897.31; 280/799, 800, 785, 781

[56] References Cited

U.S. PATENT DOCUMENTS

| | | | |
|---|---|---|---|
| 2,629,120 | 2/1953 | Nelson | 14/69.5 |
| 3,510,015 | 5/1970 | Roshaven | 414/537 |
| 3,517,791 | 6/1970 | Miles | 193/41 |
| 4,478,549 | 10/1984 | Stelly et al. | 414/537 |
| 4,601,632 | 7/1986 | Agee | 414/537 |
| 5,215,331 | 6/1993 | Pittman | 280/800 |
| 5,325,558 | 7/1994 | Labreche | 414/537 |
| 5,412,860 | 5/1995 | Miyauchi et al. | 29/897.2 |
| 5,494,393 | 2/1996 | Schrunk | 414/537 |
| 5,730,577 | 3/1998 | Jones | 414/462 |
| 5,768,733 | 6/1998 | Kneebone | 414/537 |
| 5,815,870 | 10/1998 | Deutch et al. | |

Primary Examiner—Christopher P. Ellis
Assistant Examiner—Isobel A. Parker
Attorney, Agent, or Firm—Domingue, Delaune & Waddell, PLC

[57] ABSTRACT

A mating pair of portable metal ramps for use with pickup trucks, trailers and vans to load and unload small sized wheeled vehicles such as all terrain vehicles, riding lawn mowers, small tractors and motorcycles. The side beams of each ramp have a longitudinal groove into which the ends of three or more cross beams are recessed. The grooves sufficiently support and maintain the cross beams about the ramp that it is only necessary to weld the cross beam/side beam joints in those areas accessible from the underside of the ramp.

20 Claims, 3 Drawing Sheets

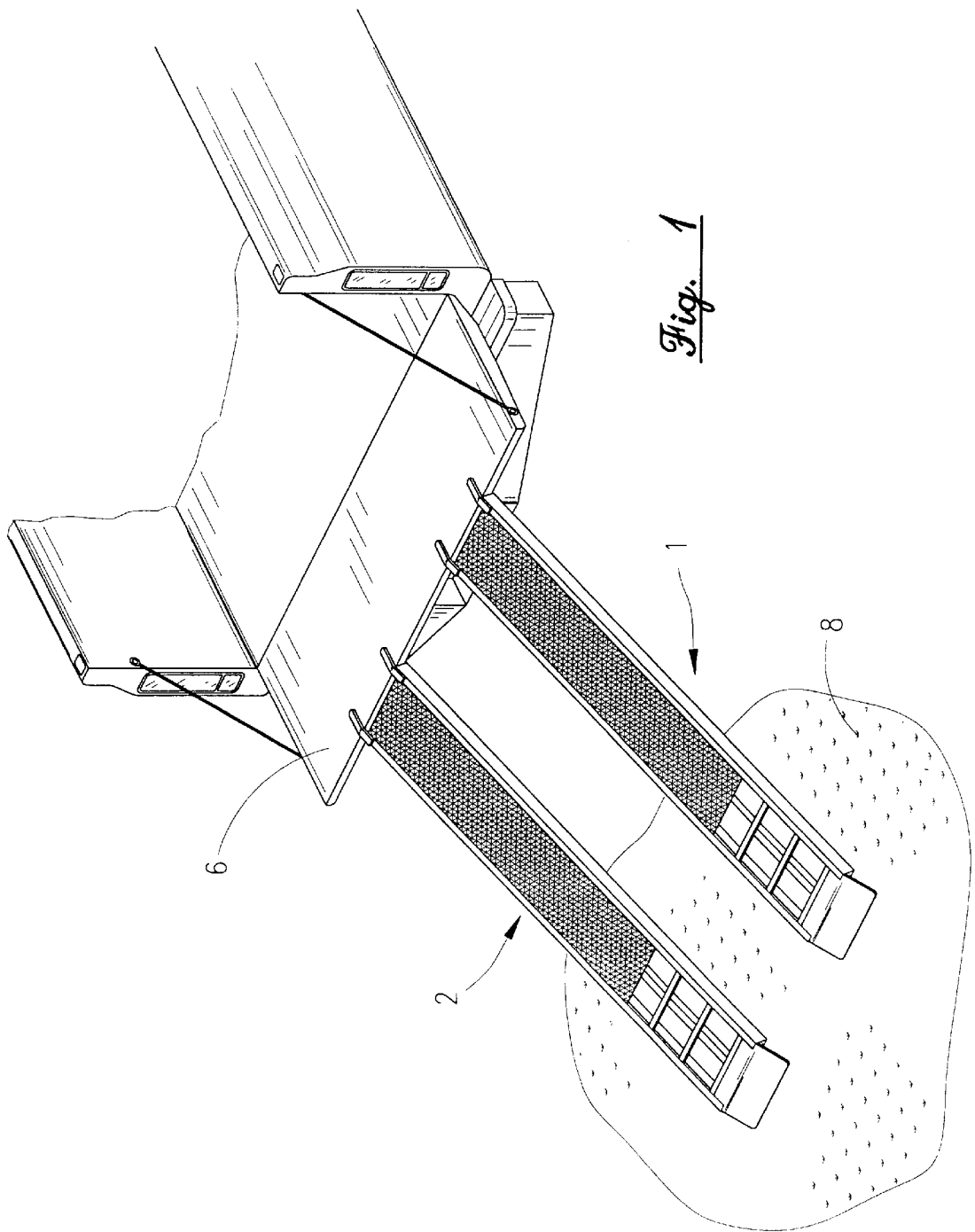

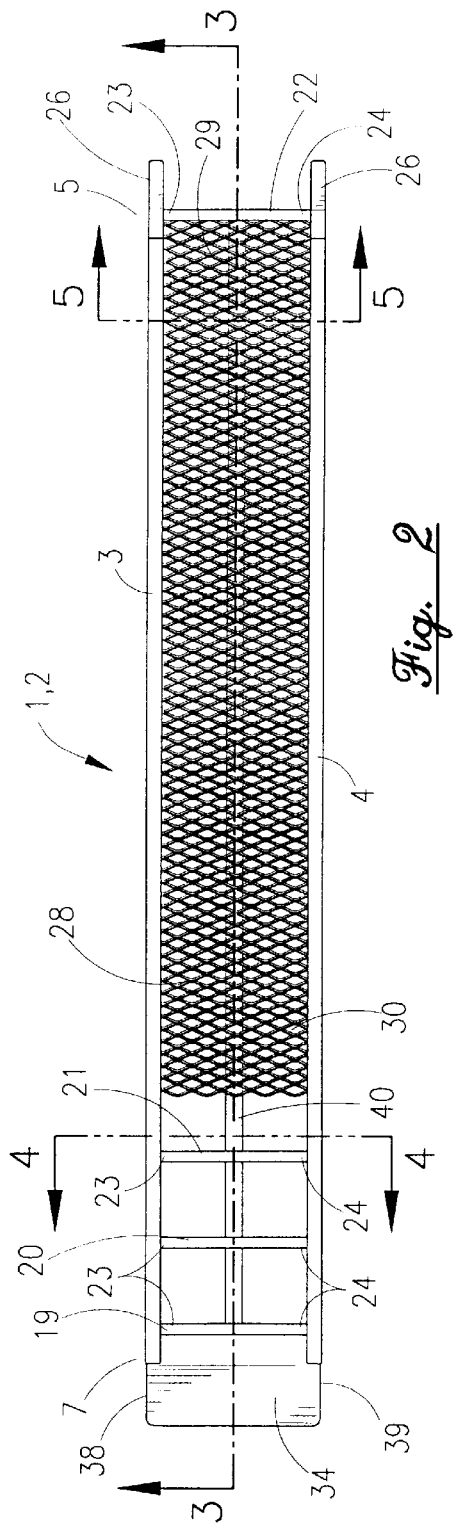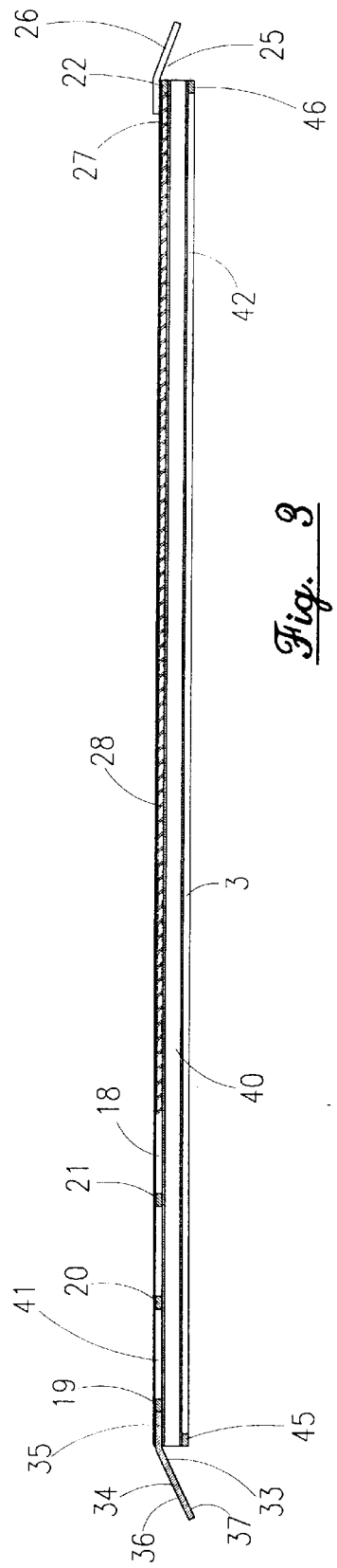

LOADING AND UNLOADING RAMP FOR PICKUP TRUCKS TRAILERS AND VANS

FIELD OF THE INVENTION

The present invention relates to portable ramps for use with pickup trucks, trailers and vans to load and unload small sized wheeled vehicles such as all terrain vehicles, riding lawn mowers, small tractors and motorcycles and also to methods of manufacturing the portable ramps.

BACKGROUND OF THE INVENTION

Pickup trucks, trailers and vans have commonly been used to transport small sized wheeled vehicles such as all terrain vehicles, riding lawn mowers, small tractors and motorcycles. Although relatively small in size, these wheeled vehicles can weigh anywhere between 500 and 1,000 pounds and therefore cannot be easily lifted into the carrier vehicle. Typically, portable metal ramps have been employed to provide a way to easily load and unload these small sized wheel vehicles from the bed of pickup trucks or the cargo area of trailers and vans. During loading, the top end of the ramp is placed on the edge of the tailgate of the pickup truck or the loading end of the trailer or van and the bottom end rests on the ground. The all terrain vehicle, riding lawn mower, small tractor or motorcycle is then pushed or driven onto the ramp where it travels up the ramp and into the bed of the pickup truck or cargo area of the trailer or van. The ramp is then removed, stored in the carrier vehicle and the cargo is transported to another location where it is unloaded. During unloading, the top end of the ramp is again placed on the edge of the tailgate of the pickup truck or the loading end of the trailer or van and the bottom end rests on the ground. The all terrain vehicle, riding lawn mower, small tractor or motorcycle is then pushed or driven onto the ramp where it travels back down the ramp and comes to rest on the ground. The ramp may again be stored in the carrier vehicle for later use.

The ramps are typically either of a single hinged design having two ramp halves that fold upon each other for storage or comprise two separate ramps which are placed in parallel arrangement and at a specified distance from each other during use so that the ramps align with the wheel base of the three or four-wheeled vehicle being loaded or unloaded. The ramps are normally constructed of a light weight metal (e.g., aluminum) so that they can he conveniently handled by one person to load and unload the vehicle to be transported. Examples of portable ramps are described in the following patents:

U.S. Pat. No. 4,478,549 discloses a loading ramp having left and right rectangular ramp panels. At the top of each ramp panel section there is a pair of tailgate anchors which engage the tailgate of the truck, trailer or van when the ramp is operational. Flexible cables are attached to each ramp section to form a tension carrying removable connection extending between each ramp section and the truck, trailer or van during use. The left and right ramp panel sections are connected together by a hinge assembly at cooperating, abutting mating edges so that they can fold onto each other to reduce the ramp for storage.

U.S. Pat. No. 3,517,791 discloses a pair of ramps which may be used for loading and unloading cargo from trucks. The pair of ramps may be used separately to provide flexibility of use and may be used in a parallel engaged position to provide a wider ramp surface for handling wider cargo.

U.S. Pat. No. 5,730,577 discloses a motorcycle loading and unloading device including a ramp having a pair of spaced, parallel ramp rails. The ramp is adapted to be connected with a pair of bed rails that are carried on the bed of a truck or on the bed of a trailer.

Generally, the structural framework of the ramp includes two side beams and three or more cross beams which extend between the side beams. The ends of the cross beams are welded to the inner side wall of the respective side beams. To ensure structural stability, customarily the entire circumference around the end of each cross beam is welded to the inner side wall of the side beams. This process requires that the welding be accomplished from both the top side of the ramp and from the underside of the ramp in order to gain access to the entirety of the welding sites. Unfortunately, this welding process is time consuming and labor intensive. Not only are extensive and complete welds required at all connection points, but the ramp itself must be manipulated during the welding process to provide access to both the ramp's top side and underside. Hence, there exists a need to eliminate a portion of the welding at the cross beam/side beam connection points in order to manufacture a more economical ramp while still maintaining the structural integrity of the ramp.

SUMMARY OF THE INVENTION

The present invention is drawn to a mating pair of loading and unloading ramps for use with pickup trucks, trailers and vans. Each ramp has a pair of elongated side beams with a first end capable of removably engaging the ramp to a loading end of a pickup truck, trailer or van during loading or unloading. Each ramp also has a second end capable of removably engaging the ramp to a ground surface during loading or unloading.

Each of the elongated side beams has a first section and a second section. The first section of each elongated side beam has a top wall, a bottom wall, an outer side wall and an inner side wall. The second section of each elongated side beam has a generally L-shaped cross section formed by an outer side wall and a connecting top wall perpendicularly positioned with respect to the outer side wall of the second section. The outer side wall of the second section of each elongated side beam is an extension of the outer side wall of the first section of each respective elongated side beam. The outer side and top walls of the second section and the top wall of the first section form a longitudinal groove extending the length of each of the elongated side beams.

A traction member having a plurality of elongated cross beams may extend transversely between the pair of elongated side beams. Each of the elongated cross beams has a proximal end and a distal end. The proximal end of each of the elongated cross beams is fixedly recessed within the groove of one of the elongated side beams and the distal end of each of the elongated cross beams is fixedly recessed within the groove of the other elongated side beam.

The first end of each of the elongated side beams may include an anchor means which provides the capability of the first end of the elongated side beams to removably engage the ramp to the loading end of the pickup truck, trailer or van. The anchor means may be a bracket fixedly connected to a top side of the first end of each of the elongated side beams.

The traction member may also be a traction plate that is fixedly positioned between the pair of elongated side beams. The traction plate has a top edge, a bottom edge, and left and right side edges. The left side edge is recessed within the groove of one of the elongated side beams and the right side edge is recessed within the groove of the other elongated side beam.

The second end of each of the elongated side beams may also include a ground support means which provides the capability of the second ends to removably engage the ramp to the ground surface. The ground support means may comprise an angular plate. A portion of the angular plate is fixedly positioned between the elongated side beams at the second ends thereof. The angular plate has a top edge, a bottom edge, and left and right side edges. The left side edge is partially recessed within the groove of one of the elongated side beams and the right side edge is partially recessed within the groove of the other elongated side beam.

The present invention is also drawn to a novel method of manufacturing a loading and unloading ramp for use with pickup trucks, trailers and vans. The method involves providing a pair of elongated side beams. Each of the elongated side beams has a first section and a second section. The first section has a top wall, a bottom wall, an outer side wall and an inner side wall. The second section has a generally L-shaped cross section formed by an outer side wall and a connecting top wall perpendicularly positioned with respect to the outer side wall of the second section. The outer side wall of the second section is an extension of the outer side wall of the first section. The outer side and top walls of the second section and the top wall of the first section form a longitudinal groove extending the length of each of the elongated side beams.

The method also involves attaching an anchor means at a first end of each of the elongated side beams. The anchor means is capable of removably engaging the ramp to a loading end of the pickup truck, trailer or van during loading or unloading. A ground support means is attached to a second end of each of the elongated side beams. The ground support means is capable of removably engaging the ramp to a ground surface during loading or unloading.

The method further involves providing a central longitudinal support beam spaced equidistant between the elongated side beams and extending parallel therewith. The central longitudinal support beam has a top surface, a bottom surface and two interconnecting side surfaces. A traction member having a plurality of elongated cross beams is provided and extends transversely between the pair of elongated side beams and partially rest on the top surface of the central longitudinal support beam. Each of the elongated cross beams has a proximal end and a distal end. The proximal end of each of the elongated cross beams is fixedly recessed within the groove of one of the elongated side beams and the distal end of each of the elongated cross beams is fixedly recessed within the groove of the other elongated side beam.

The proximal and distal ends of each of the elongated cross beams may be fixedly recessed within the grooves by welding each proximal end to the inner side wall of one of the elongated side beams and by welding each distal end to the inner side wall of the other elongated side beam. The elongated cross beams may also be attached to the central longitudinal support beam by welding a portion of the bottom wall of each elongated cross beam to the side surfaces of the central longitudinal support beam.

The traction member may also be a traction plate that is fixedly positioned between the pair of elongated side beams. The traction plate has a top edge, a bottom edge, and left and right side edges. The left side edge is recessed within the groove of one of the elongated side beams and the right side edge is recessed within the groove of the other elongated side beam. The top and/or bottom edges of the traction plate may be welded to one or more of the elongated cross beams.

The traction plate may also be attached to the central longitudinal support beam by welding a portion of the traction plate to the top surface of the central longitudinal support beam.

The novel loading and unloading ramp of the present invention obviates many of the problems of the prior art, particularly the problems associated with labor intensive and complicated welding of component parts. The advantages of the present invention are achieved in part by the novel design of the elongated side beams. In particular, the elongated side beams of the present invention are each constructed with a longitudinal groove formed by the outer side and top walls of the second section and the top wall of the first section of each elongated side beam. The grooves are used to support and maintain the traction member having a plurality of cross beams, the ends of which are recessed within the groove. The groove may also be used to support and maintain other ramp components, such as the traction member in the form of a traction plate and angular plate, which extend between the two elongated side beams and provide an additional framework for the ramp.

Because the groove (i.e., the outer side and top wall of the second section and the top wall of the first section of each elongated side beam) confines, supports and maintains the ends of the elongated cross beams and other ramp components (e.g., traction plate and angular plate), the need to weld around the complete circumference of the ends of the cross beams and the other components where they contact the inner wall of the side beams is alleviated. Rather than welding around the entire or substantially around the entire circumference (which requires the manipulation of the ramp to get access to the top side and the underside), the ends of the cross beams and other components where they contact the inner wall of the side beams need only be welded at areas accessible from the underside of the ramp.

The elimination of part of the time consuming and labor intensive welding process as a result of the groove design produces a ramp that is more economical to manufacture but at the same time has a structural integrity that is akin to, if not better than, the prior art ramps. Moreover, because most of the welding of component parts is done on the underside of the ramp and the welding is only visible when the ramp's underside is revealed, the present invention is more aesthetically pleasing.

These and many other objects and advantages will be readily apparent to one skilled in the art to which the invention pertains from a perusal of the claims and the following detailed description of the preferred embodiments read in conjunction with the appended drawings.

BRIEF DESCRIPTION OF THE DRAWINGS

FIG. 1 is a perspective view of the mating pair of load and unloading ramps of the present invention in their operational position about a tailgate of a pickup truck;

FIG. 2 is a top view of a loading and unloading ramp of the present invention;

FIG. 3 is a cross sectional view of a loading and unloading ramp of the present invention taken along lines 3—3 of FIG. 2;

DETAILED DESCRIPTION OF THE PREFERRED EMBODIMENTS

Figure 4:
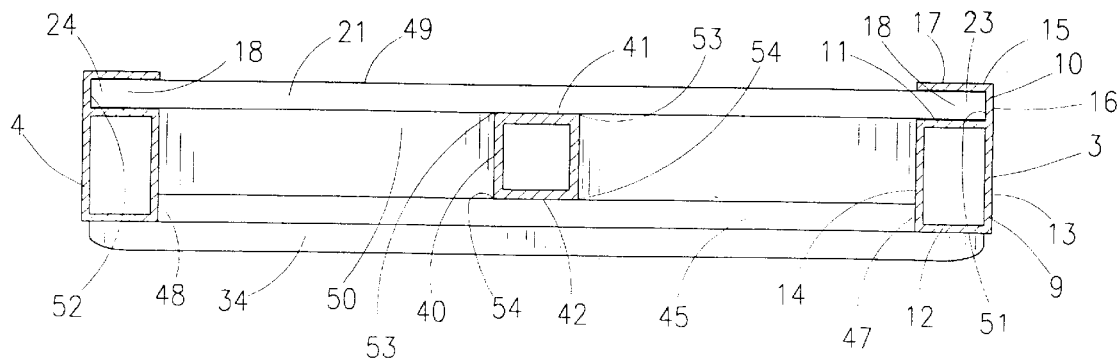
FIG. 4 is a cross sectional view of a loading and unloading ramp of the present invention taken through lines 4—4 of FIG. 2.

With reference to the figures where like elements have been given like numerical designation to facilitate an understanding of the present invention, and particularly with reference to the embodiment of the mating pair of loading and loading ramps for pickup trucks, trailers and vans of the present invention illustrated in FIGS. 1 and 2, each of the loading and unloading ramps 1, 2 may be constructed of a pair of elongated side beams 3, 4. Preferably, each elongated side beam 3, 4 has a first end 5 capable of removably engaging ramp 1, 2 to loading end 6 of a pickup truck, trailer or van during loading or unloading and a second end 7 capable of removably engaging ramp 1, 2 to ground surface 8 during loading or unloading.

Figure 5:
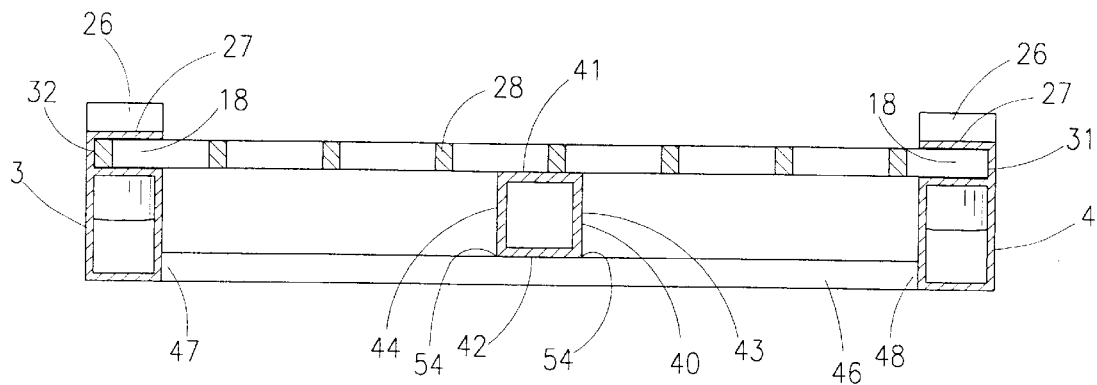
FIG. 5 is a cross sectional view of a loading and unloading ramp of the present invention taken through lines 5—5 of FIG. 2.

As further shown in FIGS. 4 and 5, elongated side beams 3, 4 may each have a first section 9 and a second section 10. Preferably, first section 9 has a top wall 11, a bottom wall 12, an outer side wall 13 and an inner side wall 14. Also, second section 10 may have a generally L-shaped cross section 15 formed by an outer side wall 16 and a connecting top wall 17 perpendicularly positioned with respect to outer side wall 16 of second section 10. Preferably, outer side wall 16 of second section 10 is an extension of outer side wall 13 of first section 9.

Again with reference to FIGS. 4 and 5, outer side wall 16 and top wall 17 of second section 10 and top wall 11 of first section 9 may form a longitudinal groove 18. Preferably, groove 18 extends substantially the entire length of each of elongated side beams 3, 4.

Figure 6:
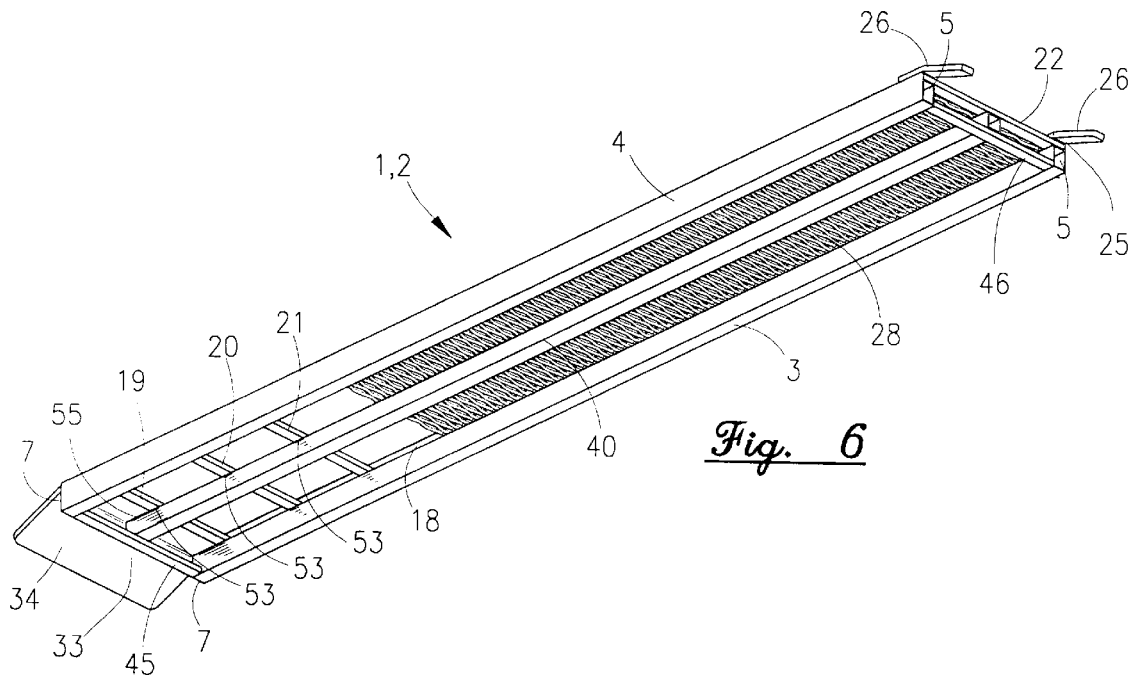
FIG. 6 is a bottom perspective view of a loading and unloading ramp of the present invention.

As shown in FIGS. 1 and 6, a traction member having plurality of elongated cross beams 19, 20, 21, 22 preferably extend transversely between elongated side beams 3, 4. Elongated cross beams 19, 20, 21, 22 each may have a proximal end 23 and a distal end 24. Proximal end 23 of each elongated cross beams 19, 20, 21, 22 may be fixedly recessed within groove 18 of one of elongated side beams 3, 4 and distal end 24 of elongated cross beams 19, 20, 21, 22 may be fixedly recessed within groove 18 of the other elongated side beam 3, 4. It is to be understood that while the preferred embodiment is described as having a plurality of cross beams, one or more cross beams may in fact be utilized in the present invention depending on the size and load requirements of ramps, 1, 2.

As shown in FIGS. 2 and 3, first end 5 of elongated side beams 3, 4 may include anchor means 25 which provides the capability of each of first ends 5 to removably engage ramp 1, 2 to loading end 6 of the pickup truck, trailer or van. Preferably, anchor means 25 is a bracket 26 fixedly connected to a top side 27 of first end 5 of each of elongated side beams 3, 4. Bracket 26 may be bent at an various angles depending on the desired slant of ramp 1, 2 in order to facilitate the engagement of bracket 26 with loading end 6.

Again with reference to FIGS. 2 and 5, the traction member may be a traction plate 28 that is fixedly positioned between elongated side beams 3, 4. Preferably, traction plate 28 has a top edge 29, a bottom edge 30, and left and right side edges 31, 32. More preferably, left side edge 31 is recessed within groove 18 of one of elongated side beams 3, 4 and right side edge 32 is recessed within groove 18 of the other elongated side beam 3, 4. Traction plate 28 may be of any design so long as it provides sufficient traction or gripping action for the wheels of the vehicles being loaded and unloaded. Traction plate 28 may be solid or it may be constructed of a non solid weave pattern.

It is to be understood that ramps 1, 2 may be constructed having a traction member comprised of a plurality of elongated cross beams 19, 20, 21, 22 or may be constructed having a traction member comprised of traction plate 28 or may be constructed of a traction member comprised of a combination of a plurality of elongated cross beams 19, 20, 21, 22 and traction plate 28.

FIGS. 2 and 3 also shows that second end 7 of each of elongated side beams 3, 4 includes a ground support means 33 which provides the capability of second ends 7 to removably engage ramp 1, 2 to ground surface 8. Preferably, ground support means 33 is an angular plate 34. More preferably, a portion 35 of said angular plate 34 is fixedly positioned between elongated side beams 3, 4 at second ends 5 thereof. Also, angular plate 34 may have a top edge 36, a bottom edge 37, and left and right side edges 38, 39. It is preferred that left side edge 38 be partially recessed within groove 18 of one of elongated side beams 3, 4 and that right side edge 39 be partially recessed within groove 18 of the other elongated side beam 3, 4. Angular plate 34 may be of any design that provides sufficient ground support for ramps 1, 2.

In another embodiment also shown in FIGS. 1 and 2, ramps 1, 2 may have a first elongated side beam 3 and a second elongated side beam 4. Preferably, each of first and second elongated side beams 3, 4 have a first end 5 provided with an anchor means 25 capable of removably engaging ramps 1, 2 to a loading end 6 of a pickup truck, trailer or van during loading or unloading and a second end 7 provided with a ground support means 33 capable of removably engaging ramps 1, 2 to a ground surface 8 during loading or unloading operations. Preferably, anchor means 25 is a bracket 26 that is fixedly connected to top side 27 of first end 5 of each of first and second elongated side beams 3, 4.

As shown in FIGS. 4 and 5, each of first and second elongated side beams 3, 4 preferably have a first section 9 and a second section 10. First section 9 may have a top wall 11, a bottom wall 12, an outer side wall 13 and an inner side wall 14. Second section 10 may have a generally L-shaped cross section 15 formed by an outer side wall 16 and a connecting top wall 17 perpendicularly positioned with respect to outer side wall 16 of said second section 10. Preferably, outer side wall 16 of second section 10 is an extension of outer side wall 13 of first section 9. It is preferred that outer side wall 16 and top wall 17 of second section 10 and top wall 11 of first section 9 form a longitudinal groove 18. More preferably, groove 18 extends substantially the entire length of each of first and second elongated side beams 3, 4.

As best seen in FIGS. 4, 5 and 6, a central longitudinal support beam 40 may be spaced equidistant between first and second elongated side beams 3, 4 and extend parallel therewith. Preferably, central longitudinal support beam 40 has a top surface 41, a bottom surface 42 and two interconnecting side surfaces 43, 44. It is to be understood that ramps 1, 2 may have more than one central longitudinal support beam 40. Ramps 1, 2 may have two, three, four or more central longitudinal support beams 40 depending on the desired size and load capacity of ramps 1, 2.

With reference to FIGS. 2, 4 and 6, a traction member having a plurality of elongated cross beams 19, 20, 21, 22 may extend transversely between first and second elongated side beams 3, 4 and partially rest on top surface 41 of central longitudinal support beam 40. Preferably, each of elongated cross beams 19, 20, 21, 22 have a proximal end 23 and a distal end 24. More preferably, proximal end 23 of elongated cross beams 19, 20, 21, 22 is fixedly recessed within groove 18 of first elongated side beam 3 and distal end 24 of elongated cross beams 19, 20, 21, 22 is fixedly recessed within groove 18 of second elongated side beam 4.

As best shown in FIGS. 2 and 5, the traction member may be a traction plate 28 that is fixedly positioned between first and second elongated side beams 3, 4 and partially rests on top surface 41 of central longitudinal support beam 40. Preferably, traction plate 28 has a top edge 29, a bottom edge 30, and left and right side edges 31, 32. More preferably, left side edge 31 is recessed within groove 18 of first elongated side beam 3 and right side edge 32 is recessed within groove 18 of second elongated side beam 4.

Referring again to FIGS. 2 and 3, ground support means 33 may be an angular plate 34 with a portion 35 of angular plate 34 being fixedly positioned between first and second elongated side beams 3, 4 at second ends 7 thereof and also partially resting on top surface 41 of central longitudinal support beam 40. Preferably, angular plate 34 has a top edge 36, a bottom edge 37, and left and right side edges 38, 39. More preferably, left side edge 38 is partially recessed within groove 18 of first elongated side beam 3 and right side edge 39 is partially recessed within groove 18 of second elongated side beam 4.

As illustrated in FIGS. 4, 5 and 6, two additional elongated cross beams 45, 46 may extend transversely between first and second elongated side beams 3, 4 and partially rest on bottom surface 42 of central longitudinal support beam 40. Each additional elongated cross beam 45, 46 preferably has a proximal end 47 and a distal end 48. More preferably, proximal end 47 of each additional elongated cross beam 45, 46 is fixedly connected to inner side wall 14 of first section 9 of first elongated side beam 3 and distal end 48 of each additional elongated cross beam 45, 46 is fixedly connected to inner side wall 14 of first section 9 of second elongated side beam 4. It is more preferred if one of additional elongated cross beams 45, 46 extends transversely between first ends 5 of first and second elongated side beams 3, 4 and the other additional elongated cross beam 45 or 46 extends transversely between second ends 7 of first and second elongated side beams 3, 4.

Again with reference to FIGS. 4, 5 and 6, additional elongated cross beams 45, 46 may be fixedly connected to bottom surface 42 of central longitudinal support beam 40. Again, it is to be understood that ramps 1, 2 may have more than two additional elongated cross beams 45, 46. Ramps 1, 2 may have three, four or five additional elongated cross beams depending on the desired size and load capacity of ramps 1, 2.

The above described loading and unloading ramps 1, 2 may be manufactured by providing a pair of elongated side beams 3, 4. Each of elongated side beams 3, 4 may have a first section 9 and a second section 10. Preferably, first section 9 has a top wall 11, a bottom wall 12, an outer side wall 13 and an inner side wall 14. Second section 10 preferably has a generally L-shaped cross section 15 formed by an outer side wall 16 and a connecting top wall 17 perpendicularly positioned with respect to outer side wall 16 of second section 10. Also, outer side wall 16 of second section 10 preferably is an extension of outer side wall 13 of first section 9. Outer side wall 16 and top wall 17 of second section 10 and top wall 11 of first section 9 preferably form a longitudinal groove 18 extending the length of each of elongated side beams 3, 4.

Anchor means 25 may be attached at first end 5 of each elongated side beam 3, 4. Preferably, anchor means 25 are welded as first end 5 of each elongated side beam 3, 4. Ground support means 33 may be attached to second end 7 of each elongated side beam 3, 4. Preferably, ground support means 33 are welded to second end 7 of each elongated side beam 3, 4.

Central longitudinal support beam 40 may be provided. Central longitudinal support beam 40 may be spaced equidistant between elongated side beams 3, 4 and extend parallel therewith. Preferably, central longitudinal support beam 40 has a top surface 41, a bottom surface 42 and two interconnecting side surfaces 43, 44.

A traction member having a plurality of elongated cross beams 19, 20, 21, 22 may also be provided. Elongated cross beams 19, 20, 21, 22 may each have a top wall 49, a bottom wall 50 and two interconnecting side walls 51, 52. Elongated cross beams 19, 20, 21, 22 may extend transversely between elongated side beams 3, 4 and partially rest on top surface 41 of central longitudinal support beam 40. Preferably, each elongated cross beam 19, 20, 21, 22 has a proximal end 23 and a distal end 24. Proximal end 23 of each elongated cross beam 19, 20, 21, 22 is fixedly recessed within groove 18 of one of elongated side beams 3, 4. Also, distal end 24 of each elongated cross beam 19, 20, 21, 22 is preferably fixedly recessed within groove 18 of the other elongated side beam 3 or 4.

Preferably, proximal end 23 and distal end 24 of each elongated cross beam 19, 20, 21, 22 is fixedly recessed within grooves 18 by welding each proximal end 23 to inner side wall 14 of one of elongated side beams 3, 4 and by welding each distal end 24 to inner side wall 14 of the other elongated side beam 3, 4.

Each elongated cross beam 19, 20, 21, 22 may also be attached to central longitudinal support beam 40 by welding a portion 53 of bottom wall 50 of each elongated cross beam 19, 20, 21, 22 to side surfaces 43, 44 of central longitudinal support beam 40.

The traction member provided may also be traction plate 28 having a top edge 29, a bottom edge 30, and left and right side edges 31, 32. Traction plate 28 is preferably fixedly positioned between the pair of elongated side beams 3, 4 and partially rests on top surface 41 of central longitudinal support beam 40. More preferably, left side edge 31 is recessed within groove 18 of one of elongated side beams 3, 4 and right side edge 32 is recessed within groove 18 of the other elongated side beam 3 or 4. Top edge 29 may be welded to elongated cross beam 22 and bottom edge 30 may be welded to another elongated cross beam, such as for example, elongated cross beam 21. In addition, traction plate 28 may also be welded to top surface 41 of central longitudinal support beam 40.

Two additional elongated cross beams 45, 46 may also be provided. Additional elongated cross beams 45, 46 may extend transversely between elongated side beams 3, 4 and partially rest on bottom surface 42 of central longitudinal support beam 40. Preferably, each additional elongated cross beam 45, 46 has a proximal end 47 and a distal end 48. Preferably, proximal end 47 of each additional elongated cross beam 45, 46 is welded to inner side wall 14 of first section 9 of one of elongated side beams 3, 4 and distal end 48 of each additional elongated cross beam 45, 46 is welded to inner side wall 14 of first section 9 of the other elongated side beam 3, 4.

Additional elongated cross beams 45, 46 may be attached to central longitudinal support beam 40 by welding a portion 54 of each additional elongated cross beam 45, 46 to bottom surface 42 of central longitudinal support beam 40.

Ground support means 33 may be constructed as angular plate 34. If so, a portion 35 of angular plate 34 is preferably welded to inner side wall 14 of first section 9 of each elongated side beam 3, 4 and portion 55 of angular plate 34 is preferably welded to each side surface 43, 44 of central longitudinal support beam 40.

The welding of cross beams 19, 20, 21, 22 and of traction plate 28 and angular plate 34 to inner side wall 14 of elongated side beams 3, 4 may be accomplished from the underside of ramps 1, 2.

Ramps 1, 2 may be constructed of a light weight structural material that is also sturdy enough to withstand the forces of an all terrain vehicle, riding lawn mower or tractor being ridden over ramps 1, 2. Such materials may be steel, aluminum or the like. Preferably, materials are used that are rust resistant.

The components that comprise ramps 1, 2 may be extruded using well-known processes. Preferably, elongated side beams 3, 4 are each extruded as a unitary component which requires no additional assembling.

In addition, ramps 1, 2 may be constructed in varying sizes and load capacities. For example, ramps 1, 2 may be constructed in the following dimensions: 1000 lbs. load capacity and 12 in. wide×78 in. long; 1000 lbs. load capacity and 12 in. wide×89 in. long; 1500 lbs. load capacity and 12 in. wide×89 in. long; 800 lbs. load capacity and 12 in. wide×98 in. long; 3000 lbs. load capacity and 14 in. wide× 68 in. long; 5000 lbs. load capacity and 14 in. wide×72 in. long; 7000 lbs. load capacity and 14 in. wide×94 in. long; and 10,000 lbs. load capacity and 16 in. long×90 in. wide.

While preferred embodiments of the present invention have been described, it is to be understood that the embodiments described are illustrative only and that the scope of the invention is to be defined solely by the appended claims when accorded a full range of equivalence in view of the many variations and modifications naturally occurring to those skilled in the art from perusal hereof.

What is claimed is:

1. A mating pair of loading and unloading ramps for use with pickup trucks, trailers and vans, each comprising:
    a pair of elongated side beams, each of said side beams having a first end capable of removably engaging said ramp to a loading end of said pickup truck, trailer or van during loading or unloading and a second end capable of removably engaging said ramp to a ground surface during loading or unloading;
    each of said elongated side beams having a first section and a second section, said first section having a top wall, a bottom wall, an outer side wall and an inner side wall and said second section having a generally L-shaped cross section formed by an outer side wall and a connecting top wall perpendicularly positioned with respect to said outer side wall of said second section, said outer side wall of said second section being an extension of said outer side wall of said first section;
    said outer side and top walls of said second section and said top wall of said first section forming a longitudinal groove extending the length of each of said elongated side beams;
    a traction member having a plurality of elongated cross beams extending transversely between said pair of elongated side beams, each of said elongated cross beams having a proximal end and a distal end, said proximal end of each of said elongated cross beams being fixedly recessed within said groove of one of said elongated side beams and said distal end of each of said elongated cross beams being fixedly recessed within said groove of said other elongated side beam.

2. The loading and unloading ramp according to claim 1, wherein said first end of each of said elongated side beams includes an anchor means which provides said capability of said first ends to removably engage said ramp to said loading end of said pickup truck, trailer or van.

3. The loading and unloading ramp according to claim 2, wherein said anchor means comprises a bracket fixedly connected to a top side of said first end of each of said elongated side beams.

4. The loading and unloading ramp according to claim 1, wherein said traction member is a traction plate fixedly positioned between said pair of elongated side beams, said traction plate having a top edge, a bottom edge, and left and right side edges, said left side edge being recessed within said groove of one of said elongated side beams and said right side edge being recessed within said groove of said other elongated side beam.

5. The loading and unloading ramp according to claim 1, wherein said second end of each of said elongated side beams includes a ground support means which provides said capability of said second ends to removably engage said ramp to said ground surface.

6. The loading and unloading ramp according to claim 5, wherein said ground support means comprises an angular plate, a portion of said angular plate being fixedly positioned between said elongated side beams at said second ends thereof, said angular plate having a top edge, a bottom edge, and left and right side edges, said left side edge being partially recessed within said groove of one of said elongated side beams and said right side edge being partially recessed within said groove of said other elongated side beam.

7. A loading and unloading ramp for use with pickup trucks, trailers and vans, comprising:
    a first and a second elongated side beam, each of said first and second elongated side beams having a first end provided with an anchor means capable of removably engaging said ramp to a loading end of said pickup truck, trailer or van during loading or unloading and a second end provided with a ground support means capable of removably engaging said ramp to a ground surface during loading or unloading;
    each of said first and second elongated side beams having a first section and a second section, said first section having a top wall, a bottom wall, an outer side wall and an inner side wall and said second section having a generally L-shaped cross section formed by an outer side wall and a connecting top wall perpendicularly positioned with respect to said outer side wall of said second section, said outer side wall of said second section being an extension of said outer side wall of said first section;
    said outer side and top walls of said second section and said top wall of said first section forming a longitudinal groove extending the length of each of said first and second elongated side beams;
    a central longitudinal support beam spaced equidistant between said first and second elongated side beams and extending parallel therewith, said central longitudinal support beam having a top surface, a bottom surface and two interconnecting side surfaces;

a traction member having a plurality of elongated cross beams extending transversely between said first and second elongated side beams and partially resting on said top surface of said central longitudinal support beam, each of said elongated cross beams having a proximal end and a distal end, said proximal end of each of said elongated cross beams being fixedly recessed within said groove of said first elongated side beam and said distal end of each of said elongated cross beams being fixedly recessed within said groove of said second elongated side beam.

8. The loading and unloading ramp according to claim 7, wherein said anchor means comprises a bracket fixedly connected to a top side of said first end of each of said first and second elongated side beams.

9. The loading and unloading ramp according to claim 7, wherein said traction member is a traction plate fixedly positioned between said first and second elongated side beams and partially resting on said top surface of said central longitudinal support beam, said traction plate having a top edge, a bottom edge, and left and right side edges, said left side edge being recessed within said groove of said first elongated side beam and said right side edge being recessed within said groove of said second elongated side beam.

10. The loading and unloading ramp according to claim 7, wherein said ground support means comprises an angular plate, a portion of said angular plate being fixedly positioned between said first and second elongated side beams at said second ends thereof and partially resting on said top surface of said central longitudinal support beam, said angular plate having a top edge, a bottom edge, and left and right side edges, said left side edge being partially recessed within said groove of said first elongated side beam and said right side edge being partially recessed within said groove of said second elongated side beam.

11. The loading and unloading ramp according to claim 7, further comprising two additional elongated cross beams extending transversely between said first and second elongated side beams and partially resting on said bottom surface of said central longitudinal support beam, each of said additional elongated cross beams having a proximal end and a distal end, said proximal end of each of said additional elongated cross beams being fixedly connected to said inner side wall of said first section of said first elongated side beam and said distal end of each of said additional elongated cross beams being fixedly connected to said inner side wall of said first section of said second elongated side beam.

12. The loading and unloading ramp according to claim 11, wherein one of said additional elongated cross beams extends transversely between said first ends of said first and second elongated side beams.

13. The loading and unloading ramp according to claim 12, wherein said other additional elongated cross beam extends transversely between said second ends of said first and second elongated side beams.

14. The loading and unloading ramp according to claim 13, wherein each of said additional elongated cross beams are fixedly connected to said bottom surface of said central longitudinal support beam.

15. A method of manufacturing a loading and unloading ramp for use with pickup trucks, trailers and vans, comprising the steps of:
   a) providing a pair of elongated side beams, each of said elongated side beams having a first section and a second section, said first section having a top wall, a bottom wall, an outer side wall and an inner side wall and said second section having a generally L-shaped cross section formed by an outer side wall and a connecting top wall perpendicularly positioned with respect to said outer side wall of said second section, said outer side wall of said second section being an extension of said outer side wall of said first section, said outer side and top walls of said second section and said top wall of said first section forming a longitudinal groove extending the length of each of said elongated side beams;
   b) attaching an anchor means at a first end of each of said elongated side beams, said anchor means capable of removably engaging said ramp to a loading end of said pickup truck, trailer or van during loading or unloading;
   c) attaching a ground support means to a second end of each of said elongated side beams, said ground support means capable of removably engaging said ramp to a ground surface during loading or unloading;
   d) providing a central longitudinal support beam spaced equidistant between said elongated side beams and extending parallel therewith, said central longitudinal support beam having a top surface, a bottom surface and two interconnecting side surfaces;
   e) providing a traction member having plurality of elongated cross beams extending transversely between said pair of elongated side beams and partially resting on said top surface of said central longitudinal support beam, each of said elongated cross beams having a proximal end and a distal end;
   f) fixedly recessing said proximal end of each of said elongated cross beams within said groove of one of said elongated side beams;
   g) fixedly recessing said distal end of each of said elongated cross beams within said groove of said other elongated side beam;
wherein said proximal and said distal end of each of said elongated cross beams are fixedly recessed within said grooves by welding said each proximal end to said inner side wall of one of said elongated side beams and by welding said each distal end to said inner side wall of said other elongated side beam.

16. The method of manufacturing a loading and unloading ramp according to claim 15, wherein said traction member is a traction plate which is fixedly positioned between said pair of elongated side beams and partially rests on said top surface of said central longitudinal support beam, said traction plate having a top edge, a bottom edge, and left and right side edges, said left side edge being recessed within said groove of one of said elongated side beams and said right side edge being recessed within said groove of said other elongated side beam.

17. The method of manufacturing a loading and unloading ramp according to claim 15, wherein each of said elongated cross beams has a top wall, a bottom wall and two interconnecting side walls and further comprising the step of:
   h) attaching each of said elongated cross beam to said central longitudinal support beam by welding a portion of said bottom wall of each of said elongated cross beams to said side surfaces of said central longitudinal support beam.

18. The method of manufacturing a loading and unloading ramp according to claim 17, further comprising the steps of:
   i) providing two additional elongated cross beams extending transversely between said pair of elongated side beams and partially resting on said bottom surface of said central longitudinal support beam, each of said additional elongated cross beams having a proximal end and a distal end, said proximal end of each of said additional elongated cross beams being welded to said inner side wall of said first section of one of said elongated side beams and said distal end of each of said additional elongated cross beams being welded to said inner side wall of said first section of said other elongated side beam;

j) attaching each of said additional elongated cross beams to said central longitudinal support beam by welding a portion of each of said two additional elongated cross beams to said bottom surface of said central longitudinal support beam.

19. The method of manufacturing a loading and unloading ramp according to claim 15, wherein said ground support means comprises an angular plate, a portion of said angular plate being fixedly positioned between said elongated side beams at said second ends thereof and partially resting on said top surface of said central longitudinal support beam, said angular plate having a top edge, a bottom edge, and left and right side edges, said left side edge being partially recessed within said groove of one of said elongated side beams and said right side edge being partially recessed within said groove of said other elongated side beam.

20. The method of manufacturing a loading and unloading ramp according to claim 19, wherein said portion of said angular plate is fixedly positioned between said elongated side beams by welding said portion of said angular plate to said inner side wall of said first section of each of said elongated side beams and by welding said portion of said angular plate to each of said side surfaces of said central longitudinal support beam.

* * * * *